US006641658B1

(12) United States Patent
Dubey (10) Patent No.: US 6,641,658 B1
(45) Date of Patent: Nov. 4, 2003

(54) RAPID SETTING CEMENTITIOUS COMPOSITION

(75) Inventor: Ashish Dubey, Grayslake, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

(21) Appl. No.: 10/189,879

(22) Filed: Jul. 3, 2002

(51) Int. Cl.$^7$ .................... C04B 18/06; C04B 11/00; C04B 11/06; C04B 11/30

(52) U.S. Cl. ................ 106/705; 106/695; 106/696; 106/772; 106/773; 106/774; 106/819; 106/823; 106/706; 106/707; 106/708

(58) Field of Search ..................... lp;1p106/705, 106/ 695, 696, 772, 773, 774, 819, 823, 706, 707, 708

(56) References Cited

U.S. PATENT DOCUMENTS

| | | | | |
|---|---|---|---|---|
| 4,012,264 A | * | 3/1977 | Murray et al. | 106/695 |
| 4,045,237 A | * | 8/1977 | Gaines et al. | 106/695 |
| 4,157,263 A | * | 6/1979 | Gaines et al. | 106/695 |
| 4,310,358 A | | 1/1982 | Azuma et al. | 106/97 |
| 4,350,533 A | | 9/1982 | Galer et al. | 106/89 |
| 4,357,166 A | * | 11/1982 | Babcock | 106/650 |
| 4,366,209 A | * | 12/1982 | Babcock | 428/446 |
| 4,488,909 A | | 12/1984 | Galer et al. | 106/89 |
| 4,762,561 A | * | 8/1988 | Holub et al. | 106/695 |
| 5,454,866 A | * | 10/1995 | Gilbert et al. | 106/695 |

* cited by examiner

*Primary Examiner*—Elizabeth D. Wood
(74) *Attorney, Agent, or Firm*—John M. Lorenzen; David F. Janci; Jenkens & Gilchrist (57) ABSTRACT

A rapid setting cementitious composition useful for making cement boards employs an insoluble form of anhydrous calcium sulfate (anhydrite) to accelerate setting and to permit reducing the amount of high alumina cement usage.

45 Claims, 6 Drawing Sheets

RAPID SETTING CEMENTITIOUS COMPOSITION

BACKGROUND OF THE INVENTION

This invention relates generally to rapid setting cementitious compositions that can be used for a variety of applications in which rapid hardening and early strength is desirable. In particular, the invention relates to those cementitious compositions which can be used to make boards for use in wet locations in buildings, for example the Durock® board produced by the United States Gypsum Company. Such boards are made under conditions which provide a rapid setting of the cementitious mixture so that the boards can be handled soon after the cementitious mixture is poured into a stationary or moving form or over a continuously moving belt. Ideally, this will be as soon as 10 minutes, but more practically, setting of the cement mixture may be achieved up to about 20 minutes after being mixed with a suitable amount of water.

In U.S. Pat. No. 4,488,909, Galer et al discuss cementitious compositions capable of such rapid setting. Their compositions permit high speed production of carbon dioxide resistant cement boards by forming essentially all of the potential ettringite within about minutes after the composition is mixed with water. The essential components of their cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates, which are responsible for the early setting of the cementitious mixture.

In general, Galer's formulation suffers from several major limitations. These limitations, as highlighted, as highlighted below, are even more of a concern for the production of cement boards:

The final setting times of the cementitious mixtures are typically greater than 9 minutes. The final setting time is defined further in the examples below, but more generally, the cementitious mixtures have set to the extent that cement boards can be handled and stacked, although chemical reactions may continue for extended periods.

The amount of high alumina cement in the reactive powder blend is very high. Typically, the high alumina cement is greater than 14 wt % of the reactive powder blend.

The amount of pozzolanic materials is limited to 25 wt % of the reactive powder blend.

Lime is required as an additional ingredient to obtain rapid set. Presence of excess lime in cement boards is detrimental to their long-term durability performance, because the cement boards of interest are reinforced with polymer coated glass fiber mesh that degrades, losing strength and ductility in a high alkaline environment. Presence of excess lime increases the alkalinity of the cementitious matrix and thereby negatively impacts the long-term durability performance of the polymer coated glass fiber mesh and the resulting cement board.

Ettringite is a compound of calcium aluminum sulfate compound having the formula:

or alternatively:

Ettringite forms as long needle-like crystals and provides rapid early strength to the cement boards, so that they can be handled soon after being poured into a mold or over a continuous casting and forming belt. In the Galer et al compositions, alumina required for the formation of ettringite is supplied by high alumina cement (HAC) that typically contains 36–42 wt % $Al_2O_3$. The bulk of the sulfate ions necessary for the formation of the ettringite are provided by adding gypsum, which is normally soluble in water. The lime needed for the formation of ettringite is provided by the portland cement and the added lime. The HAC is less soluble and is typically present in excess of that needed for ettringite formation. Thus, the gypsum and added lime are substantially consumed in the formation of ettringite. The availability of the HAC is usually increased by using a finely ground material. Since, an excess of HAC is present in the cement board, it would be desirable to reduce its consumption as HAC is one of the more expensive components.

High alumina cement has an advantage over portland cement since the HAC develops its maximum strength much earlier. However, it does not retain that strength over time as secondary reactions occur. It is of interest to note that the HAC does not set very rapidly by itself, it is its contribution to the formation of ettringite which makes it valuable in production of cement boards. Thus, the amount of HAC used in the cement boards should be limited to what is necessary for forming ettringite in quantities sufficient enough to allow handling of the cement boards. Also, since HAC is more expensive than portland cement, the cost of making the cement boards can be reduced substantially if HAC is limited to smaller amounts, or even eliminated.

In the Galer et al composition, about 72 to 80 wt % is portland cement, about 14 to 21 wt % is HAC, about 3.5 to 10 wt % is calcium sulfate, and about 0.4 to 0.7 wt % is hydrated lime. Other materials, such as pozzolanic materials, e.g. fly ash, superplasticizers, and other cement additives may be included. The calcium sulfate was said to be in the form of gypsum (the dihydrate), the hemihydrate, anhydrite, or synthetic $CaSO_4$. Since the gypsum was stated by Galer et al to be the most soluble component used in forming ettringite, and commercial grades of the dihydrate were preferred and exemplified in the '909 patent, one skilled in the art would conclude that solubility of the gypsum source would be an important criteria in selecting the calcium sulfate source used in the cement boards. However, the present inventor has discovered that insoluble forms of calcium sulfate not only can be used in making cement boards, but that insoluble forms of anhydrous calcium sulfate (anhydrite) actually increase the speed with which ettringite is formed. This discovery makes possible a reduction in the amount of HAC in the cement board, while obtaining extremely rapid setting of the cementitious mixture. Alternatively the speed with which the cement boards are produced can be increased without increasing the amount of HAC used. Moreover, in the present invention it has also been discovered that very high proportions of pozzolanic materials such as fly ash may be used, with no externally added lime to obtain the rapid setting cementitious compositions of the invention.

It was an objective of the present inventor to develop a cementitious composition that is capable of developing an extemely rapid set while simultaneously satisfying the following conditions:

The reactive powder blend of the cementitious composition should contain low concentrations of high alumina cement. Reducing high alumina cement usage would help to lower the cost of the product since high alumina cement is the most expensive component of the cementitious composition. Also, decreasing the setting time could increase the production rate of cement boards.

The reactive powder blend of the cementitious composition should contain very high concentrations of pozzolanic materials (up to 55 wt % of the reactive powder blend) such as fly ash. Increasing use of pozzolanic materials such as fly ash would help to substantially lower the cost of the product. Moreover, use of pozzolanic materials would also help to increase the long-term durability of the product due to the pozzolanic effects.

The reactive powder blend of the cementitious composition should be free of externally added lime. Reduced lime content would help to lower the alkalinity of the cementitious matrix and thereby increase the long-term durability of the product.

The final setting time (i.e., the time after which cement boards can be handled) of the cementitious composition should preferably be between 3 to 10 minutes, and most preferably be between 3 to 6 minutes. A shorter setting time would help to increase the production output and lower the manufacturing cost of the product.

SUMMARY OF THE INVENTION

A rapid setting cementitious composition containing as reactive powders portland cement, pozzolan, high alumina cement, and insoluble calcium sulfate anhydrite, provides reduced setting times compared to the prior-art cementitious compositions. The composition preferably comprises as a reactive powder blend 35 to 90 wt % portland cement, 0 to 55 wt % pozzolan, 5 to 15 wt % high alumina cement, 1 to 8 wt % insoluble calcium sulfate anhydrite. Substitution of insoluble calcium sulfate anhydrite for conventional soluble gypsum (a dihydrate) increases the release of heat and decreases setting times, despite the use of very high amounts of pozzolanic materials, preferably fly ash. The cementitious composition may also include lightweight aggregates and fillers, plus additives to impart other useful properties as desired, such as superplasticizers, set retarders, and set accelerators.

In another aspect, the invention is a precast concrete product such as cement board made using the rapid setting cementitious composition described above.

DETAILED DESCRIPTION OF THE INVENTION

Reactive Powder Blend

The principal ingredients of the reactive powder blend of the cementitious composition of the invention are portland cement, pozzolan, high alumina cement, and insoluble calcium sulfate anhydrite. The reactive powder blend of the invention provides a rapid set less than 10 minutes, and most preferably in less than 5 minutes. Such short rapid sets are made possible by providing the preferred amounts of the portland cement, pozzolan, high alumina cement, and insoluble calcium sulfate anhydrite in the composition so that formation of ettringite can take place as a result of the hydration process of this reactive powder blend. Ettringite forms very rapidly in the hydration process thus imparting rapid set and rigidity to the mixtures made with the reactive powder blend of the cementitious composition of the invention. In cement board manufacturing, it is primarily the formation of ettringite that makes possible handling of cement boards within a few minutes after the cementitious composition of the invention is mixed with a suitable amount of water. As reported in the examples, setting of the composition is characterized by initial and final set times, as measured by Gillmore needles used in the ASTM C266 test. The final set time also corresponds to the time when a cement board has been sufficiently hardened so that it can be handled. It will understood by those skilled in the art that curing reactions continue for extended periods after the final setting time has been reached.

Portland Cement

Portland cement makes up a substantial amount of the compositions of the invention. ASTM C 150 standard specification for portland cement defines portland cement as a hydraulic cement produced by pulverizing clinker consisting essentially of hydraulic calcium silicates, usually containing one or more of the forms of calcium sulfate as an inter-ground addition. To manufacture portland cement an intimate mixture of limestone and clay is ignited in a kiln to form portland cement clinker. The following four main phases of portland cement are present in the clinker—tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). The resulting clinker containing the above compounds is inter-ground with calcium sulfates to desired fineness to produce the portland cement. The other compounds present in minor amounts in portland cement include double salts of alkaline sulfates, calcium oxide, and magnesium oxide. When cement boards are to be made, the portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of portland cement, ASTM Type III portland cement is most preferred in the reactive powder blend of the cementitious compositions of the invention. This is due to its relatively faster reactivity and high early strength development. The other recognized types of hydraulic cements including white cement, slag cements such as blast-furnace slag cement, pozzolan blended cements, expansive cements may be used to replace or supplement portland cement in the composition of the invention.

Pozzolans

Another distinctive feature of the present invention is that the portland cement may be partially substituted by pozzolanic materials such as fly ash and the like in substantial quantities. ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash. All of these pozzolanic materials can be used either singly or in combined form as part of the reactive powder blend of the invention. Fly ash is the most preferred pozzolan in the reactive powder blend of the invention.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal. The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+AL_2O_3+Fe_2O_3$ in the composition. The minimum limit of $SiO_2+AL_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. The weight ratio of the pozzolanic material to the portland cement in the reactive powder blend used in the cementitious composition of the invention may be about 0/100 to 150/100, preferably 75/100 to 125/100.

High Alumina Cement

High alumina cement (HAC) is yet another type of hydraulic cement that forms a critical component of the reactive powder blend of the invention. High alumina cement is also commonly referred to as aluminous cement or calcium aluminate cement. As the name implies, high alumina cements contain a high alumina content, about 36–42 wt % is typical. Higher purity high alumina cements are also commercially available in which the alumina content can range as high as 80 wt %. These higher purity high alumina cements tend to be relatively very expensive. The high alumina cements used in the compositions of the invention are finely ground to facilitate entry of the aluminates into the aqueous phase so that rapid formation of ettringite and other calcium aluminate hydrates can take place. The surface area of the high alumina cement used in the composition of the invention will be greater than 3,000 cm$^2$/gram and typically about 4,000 to 6,000 cm$^2$/gram as measured by the Blaine surface area method (ASTM C 204).

Several manufacturing methods have emerged to produce high alumina cement worldwide. Typically, the main raw materials used in the manufacturing high alumina cement are bauxite and limestone. One manufacturing method that has been used in the US for producing high alumina cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock- pile. This granulate is then ground to the desired fineness to produce the final cement. Several calcium aluminate compounds are formed during the manufacturing process of high alumina cement. The predominant compound formed is monocalcium aluminate (CA). The other calcium aluminate and calcium silicate compounds that are formed include $C_{12}A_7$, $CA_2$, $C_2S$, $C_2AS$. Several other compounds containing relatively high proportion of iron oxides are also formed. These include calcium ferrites such as CF and $C_2F$, and calcium alumino-ferrites such as $C_4AF$, $C_6AF_2$ and $C_6A_2F$. Other minor constituents present in the high alumina cement include magnesia (MgO), titania ($TiO_2$), sulfates and alkalis. It should be noted that tricalcium aluminate (C3A) seen in ordinary portland cement is not found in high alumina cements.

Calcium Sulfate

Calcium sulfate is another important component of the reactive powder blend of the invention. Calcium sulfate provides sulfate ions necessary for the formation of ettringite. Calcium sulfate is available in several forms as follows:

Dihydrate—$CaSO_4.2H_2O$ (commonly known as gypsum)

Hemihydrate—$CaSO_4.½ H_2O$ (commonly known as stucco)

Anhydrite—$CaSO_4$ (also referred as anhydrous calcium sulfate)

While Galer et al suggested that various types of calcium sulfate could be used in their composition, the dihydrate form (gypsum) was the preferred choice. Since it is commercially available and, has good solublility in water, gypsum suggests itself as the calcium sulfate of choice for ettringite based rapid setting cementitious compositions and for making rapid setting cement boards. In the present invention, an insoluble anhydrous calcium sulfate (anhydrite) is used as the preferred calcium sulfate. When gypsum, (i.e., calcium sulfate dihydrate) is calcined, water is removed from the structure of the calcium sulfate molecule. When one and a half molecules of water are removed from the molecular structure of gypsum, the hemihydrate results, a material used in various compositions in which rehydration occurs during the setting process subsequent to the addition of the water. When two molecules of water are removed from the molecular structure of gypsum, the anhydrite results. Anhydrites formed by calcining at low temperatures are able to rehydrate when exposed to moist conditions. However, if the calcium sulfate is calcined at high temperatures, typically of about 750° F. or more, an insoluble form of calcium sulfate results. Since it has been assumed that the solubility of calcium sulfate provides an advantage in the rapid formation of ettringite, it was unexpected that an insoluble calcium sulfate anhydrite would provide improved results when substituted in rapid setting compositions such as those used to produce cement boards. It will be seen in the examples below that the insoluble calcium sulfate anhydrite provides higher slurry temperatures and more rapid setting than calcium sulfate in the dihydrate or hemihydrate forms. However, such hydrated forms of calcium sulfate could be included if desired, since they would contribute to the formation of ettringite, although not as effectively as the insoluble calcium sulfate anhydrite.

The performance of the following commercial grade calcium sulfates when used as a component in the reactive powder blends of the invention is compared in the examples presented in this document. These calcium sulfates are manufactured by the United States Gypsum Company of Illinois.

Land Plaster:

Chemically, land plaster is a dihydrate form of calcium sulfate—$CaSO_4.2H_2O$. It is manufactured by grinding gypsum rock to a fine particle size in a roller mill. The median particle size of land plaster is around 9 microns. Land plaster is a relatively low purity gypsum with about 80–90 wt % calcium sulfate dihydrate.

Terra Alba:

Chemically, Terra Alba also is a dihydrate form of calcium sulfate—$CaSO_4.2H_2O$. It is made by fine grinding and air separating a select, white, high-purity gypsum containing about 20% water of crystallization. The median particle size of Terra Alba is around 12 microns.

CSA Ground Gypsum:

Chemically, CSA Ground Gypsum is a sugar coated calcium sulfate dihydrate—$CaSO_4.2H_2O$. CSA ground gypsum is manufactured by co-milling land plaster (95% by wt.) with sugar (5% by wt.) followed by heating the resulting mixture in a reactor for about 20 hours at 250° F. The median particle size of CSA ground gypsum is around 2 microns. CSA ground gypsum is mainly used as an accelerator in the calcium sulfate hemihydrate based industrial products and plasters.

Hydrocal® (C-Base Gypsum Cement):

Chemically, Hydrocal (C-Base Gypsum Cement) is hemihydrate (alpha) form of calcium sulfate—$CaSO_4.\frac{1}{2}H_2O$. The primary use of Hydrocal is in the manufacturing of industrial products such as industrial plasters.

Snow White® F&P:

Chemically, Snow White F&P is an insoluble anhydrous form of calcium sulfate. It is manufactured by high temperature calcination of a high-purity gypsum rock. The calcined material is ground and air separated into a bright white powder. The median particle size of Snow White F&P is around 7 microns. Its main use is in food and pharmaceutical formulations. The combined water content of Snow White F&P is less than 0.35%.

CAS-20-4:

Chemically, CAS-20-4 is an insoluble anhydrous form of calcium sulfate. It is manufactured by high temperature calcination of a high purity gypsum rock. CAS-20-4 is extremely white in color, and its median particle size is around 4 microns. The combined water content of CS-20-4 is less than 0.20%.

Aggregates and Fillers

While the disclosed reactive powder blend defines the rapid setting component of the cementitious composition of the invention, it will be understood by those skilled in the art that other materials may be included in the composition depending on its intended use and application. For instance, for cement board applications, it is desirable to produce lightweight boards without unduly comprising the essential mechanical properties of the product. This objective is achieved by adding lightweight aggregates and fillers in the composition. Examples of useful lightweight aggregates and fillers include blast furnace slag, volcanic tuff, pumice, expanded forms of clay, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density. Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

Chemical Additives

Chemical additives such as water reducing agents, superplasticizers, set accelerators, and set retarders may be included in the compositions of the invention. They may be added in the dry form or in the form of a solution. Use of set retarder as a component in the compositions of the invention is particularly critical since without it flash setting of the reactive powder blend of the invention may occur as soon as water is added to the mixture. The need and usefulness of set retarder in the composition increases with increase in the temperature of the composition. Examples of useful set retarders include sodium citrate, citric acid, potassium tartrate, sodium tartrate, and the like. In the compositions of the invention, sodium citrate is the preferred set retarder. The weight ratio of the set retarder to the reactive powder blend generally is less than 1.0 wt %, preferably less than 0.20 wt %. Superplasticizers help to reduce the water demand of the mixture. Examples of superplasticizers include polynapthalene sulfonates, polyacrylates, lignosulfonates, melamine sulfonates, and the like. The weight ratio of the superplasticizer (dry powder basis) to the reactive powder blend typically will be about 1.0 wt % or less, preferably less than 0.50 wt %. Set accelerators may also be included as a component in the compositions of the invention. Examples of useful set accelerators include sodium carbonate, calcium chloride, calcium nitrate, calcium nitrite, calcium formate, calcium acetate, and the like. The weight ratio of the set accelerator to the reactive powder blend typically will be less than 1.0 wt %, preferably less than 0.50 wt %.

Other Ingredients

When it is desired to produce lightweight products such as lightweight cement boards, air-entraining agents may be added in the composition. Alternatively, externally produced foam may be introduced in to the mixtures of the compositions of the invention during the mixing operation in order to lighten the product. Other chemical admixtures such as shrinkage control agents and coloring agents may also be added in the compositions of the invention if desired. Discrete reinforcing fibers of different types may also be included in the cementitious compositions of the invention. The cementitious composition of the invention will be combined with a suitable amount of water to hydrate the reactive powder blend and to rapidly form ettringite. Generally, the amount of water added will be greater than that is theoretically required for the hydration of the reactive powder blend. This increased water demand is allowed to facilitate the workability of the cementitious slurry. Typically, the weight ratio of the water to reactive powder blend is about 0.20/1 to 0.80/1, preferably about 0.30/1 to 0.60/1. The amount of water required will depend on the needs of the individual materials present in the cementitious composition.

Cement Boards

Cement boards are made most efficiently in a continuous process in which the reactive powder blend is blended with aggregates and additives and/or fillers and then mixed with water just before placing the mixture in a mold or over a continuous casting and forming belt. As will be appreciated from the previous discussion, the mixing with water must be done just before the casting operation. Since it is a feature of such processes that they obtain sufficient strength from the rapid formation of ettringite, the boards can be cut very soon after being formed. The formation of ettringite consumes a large amount of water so that the board becomes rigid, ready to be cut, handled and stacked for further curing.

EXAMPLES

Influence of different types of calcium sulfates on the slurry time-temperature response and slurry setting behavior is demonstrated in the following examples. One example is presented to demonstrate the influence of calcium sulfate type in the cementitious composition on the mechanical properties of the cement boards. As will be seen in the figures depicting slurry time-temperature response, within the first few minutes after the cementitious composition is mixed with water, the slurry temperature increases rapidly as ettringite formation occurs, reaching a peak in about 3 to 10 minutes. The figures show the advantage of using insoluble forms of calcium sulfate anhydrite, since higher temperatures are reached and more rapidly than with the hydrated forms of calcium sulfate. The tables in the examples below record the effect of several variables on the initial and final setting times of the cementitious compositions.

The portland cement used in the cementitious compositions in the examples presented was manufactured by Blue Circle Cement Co. of Michigan.

The fly ash used was Class C, manufactured by ISG Resources of Michigan.

The high alumina cement (HAC) was made by the Lafarge Calcium Aluminates, Inc. of Virginia. The brand name of the high alumina cement used was Ciment Fondu Lafarge.

Haydite, an expanded shale aggregate was made by the Hydraulic Brick Press Co. of Ohio.

Also included were small amounts, typically less than 0.5 wt % of the reactive powders, of sodium citrate, sodium carbonate, and polynapthalene sulfonate (a superplasticizer) to control the fluidity of the slurry and to prevent flash setting, which could interfere with placement of the slurry in a mold and negatively impact the subsequent strength development. In these examples, 0.2 wt % of the superplasticizer, 0.2 wt % of sodium carbonate and 0.07 wt % of sodium citrate, each based on the reactive powders were used.

The water to reactive powder blend ratio was 0.40/1 in the examples presented. The aggregate to reactive powder blend ratio was 0.90/1 in each example, the aggregate being expanded shale having mean particle size of about 1200 microns.

Unless otherwise stated, the mixture of dry solids (cements plus aggregates) was conditioned at 135° F. (57° C.) for 24 hours and the mixture of liquids was equilibrated at 140° F. (60° C.) before conducting the experiments. The materials were mixed for 30 seconds in a small Hobart mixer prior to recording the time-temperature response and set time measurements.

Example 1

In this example, the objective was to investigate the influence of calcium sulfate type on time-temperature response and initial and final set times. The following calcium sulfates were investigated:

Dihydrate-Land Plaster, $CaSO_4.2H_2O$

Dihydrate-CSA Ground Gypsum, $CaSO_4.2H_2O$

Alpha Hemihydrate-Hydrocal, $CaSO_4.\frac{1}{2}H_2O$

Anhydrite-Snow White F&P, $CaSO_4$

A total of four mixes were investigated. The weight proportions of the reactive powders used in the various mixes were as follows:

| Reactive Powder | Parts | Weight Proportion (%) |
| --- | --- | --- |
| Portland Cement Type III | 100 | 47.6 |
| Fly Ash Class C | 90 | 42.9 |
| High Alumina Cement | 15 | 7.1 |
| Calcium Sulfate | 5 | 2.4 |

Figure 1:
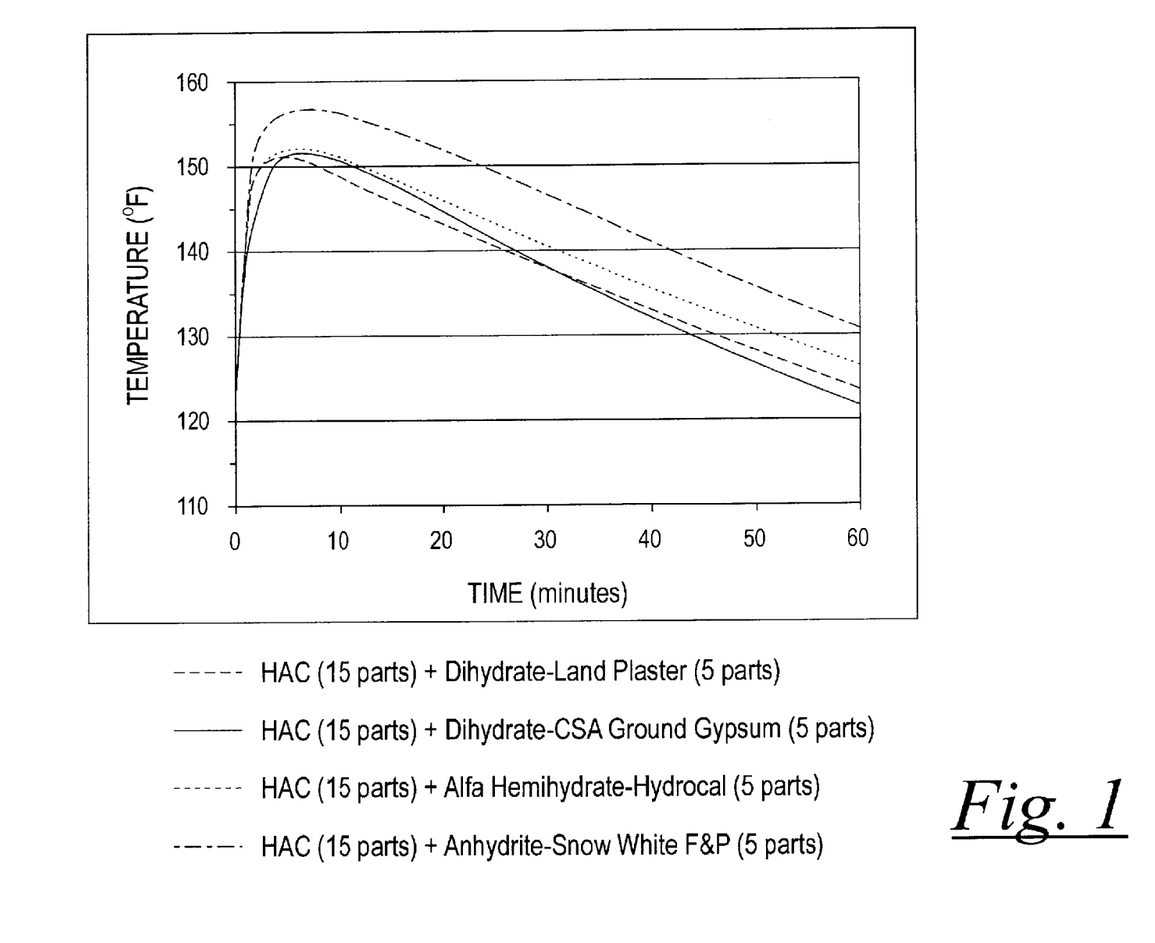
FIG. 1 is a graph of the time versus temperature results of Example 1.

FIG. 1 shows the time versus temperature behavior for the four mixes investigated. The following observations can be made from this figure:

The mix containing the insoluble calcium sulfate anhydrite (i.e., Snow White F&P) yields the highest peak temperature.

The mix containing insoluble calcium sulfate anhydrite (i.e., Snow White F&P) is most exothermic. This is evident from the greater area under the time-temperature curve for the mix containing anhydrite.

Table 1 shows the initial and final set times measured using the Gillmore needles (ASTM C 266) for the various mixes investigated. The following observations can be made from the results:

Both the initial and final set times are shortest for the mix containing insoluble calcium sulfate anhydrite (i.e., Snow White F&P).

The final set time for the mix containing the insoluble calcium sulfate anhydrite (i.e., Snow White F&P) is about three minutes shorter than that for the mix containing dihydrate form of calcium sulfate (i.e., Land Plaster).

TABLE 1

Influence of calcium sulfate type on setting times - (HAC-15 parts)

| Calcium Sulfate Type | Initial Set (minutes) | Final Set (minutes) |
| --- | --- | --- |
| Dihydrate-Land Plaster | 2.50 | 6.17 |
| Dihydrate-CSA Ground Gypsum | 3.00 | 7.50 |
| Alpha Hemihydrate-Hydrocal | 2.42 | 6.50 |
| Anhydrite-Snow White F&P | 2.00 | 3.33 |

Example 2

The objective in this example was to investigate the influence of calcium sulfate type on time-temperature response and initial and final set times. The following calcium sulfates were investigated:

Dihydrate-Land Plaster, $CaSO_4 \cdot 2H_2O$

Anhydrite-Snow White F&P, $CaSO_4$

Dihydrate-Terra Alba, $CaSO_4 \cdot 2H_2O$

Anhydrite-CAS-20-4, $CaSO_4$

The aforementioned calcium sulfates were evaluated at two HAC levels—12 and 15 parts for each 100 parts of portland cement. Thus, in total eight mixes were investigated. The weight proportions of the reactive powders used in the various mixes were as follows:

| | Reactive Powder | | | |
|---|---|---|---|---|
| | Portland Cement Type III | Fly Ash Class C | High Alumina Cement | Calcium Sulfate |
| | HAC 12 parts mixes | | | |
| Parts | 100 | 90 | 12 | 4 |
| Weight Proportion % | 48.5 | 43.7 | 5.8 | 1.9 |
| | HAC 15 parts mixes | | | |
| Parts | 100 | 90 | 15 | 5 |
| Weight Proportion % | 47.6 | 42.9 | 7.1 | 2.4 |

The following observations can be made from the time-temperature results (not shown):

The mixes containing insoluble calcium sulfate anhydrite (i.e., Snow White F&P and CAS-20-4) attain higher peak temperatures.

The compositions containing insoluble calcium sulfate anhydrite (i.e., Snow White F&P and CAS-20-4) are relatively more exothermic. This is evident from the greater area under the time-temperature curves for the mixes containing insoluble calcium sulfate anhydrite.

Tables 2 & 3 show the initial and final set times measured using the Gillmore needles (ASTM C 266) for the various mixes investigated. The following observations can be made.

Both the initial and final set times for the mixes containing insoluble calcium sulfate anhydrite (i.e., the mixes with Snow White F&P and CAS-20-4) are shorter than those for the mixes with the dihydrate form of calcium sulfate (i.e., Land Plaster and Terra Alba).

The mixes containing insoluble calcium sulfate anhydrite (i.e., Snow White F&P and CAS-20-4) yield final set times that are about 2 to 3 minutes shorter than those achieved for the mixes utilizing the dihydrate form of calcium sulfate (i.e., Land Plaster and Terra Alba).

The mixture composition with Anhydrite-CAS-204 yields the shortest final set time.

The mixture including the high purity gypsum (Terra Alba) is superior to the performance of Land Plaster, a lower purity gypsum.

TABLE 2

Influence of calcium sulfate type on setting times - (HAC-12 parts)

| Calcium Sulfate Type | Initial Set (minutes) | Final Set (minutes) |
|---|---|---|
| Dihydrate-Land Plaster | 2.67 | 7.08 |
| Anhydrite-Snow White F&P | 1.83 | 4.50 |
| Dihydrate-Terra Alba | 2.42 | 6.75 |
| Anhydrite-CAS-20-4 | 2.25 | 4.42 |

TABLE 3

Influence of calcium sulfate type on setting times - (HAC-15 parts)

| Calcium Sulfate Type | Initial Set (minutes) | Final Set (minutes) |
|---|---|---|
| Dihydrate-Land Plaster | 2.75 | 6.50 |
| Anhydrite-Snow White F&P | 1.92 | 3.92 |
| Dihydrate-Terra Alba | 2.25 | 4.50 |
| Anhydrite-CAS-20-4 | 2.08 | 3.33 |

Example 3

In this example, the objective was to investigate the influence of calcium sulfate type at different HAC levels in the composition on time-temperature response and initial and final set times. The following calcium sulfates were investigated:

Dihydrate-Land Plaster, $CaSO_4 \cdot 2H_2O$

Anhydrite-Snow White F&P, $CaSO_4$

The aforementioned calcium sulfates were evaluated at three HAC levels—12, 15 and 18 parts. Thus, in total six mixes were investigated. The weight proportions of the reactive powders used in the various mixes were as follows:

| | Reactive Powder | | | |
|---|---|---|---|---|
| | Portland Cement Type III | Fly Ash Class C | High Alumina Cement | Calcium Sulfate |
| | HAC 12 parts mixes | | | |
| Parts | 100 | 90 | 12 | 4 |
| Weight Proportion % | 48.5 | 43.7 | 5.8 | 1.9 |
| | HAC 15 parts mixes | | | |
| Parts | 100 | 90 | 15 | 5 |
| Weight Proportion % | 47.6 | 42.9 | 7.1 | 2.4 |
| | HAC 18 parts mixes | | | |
| Parts | 100 | 90 | 18 | 6 |
| Weight Proportion % | 46.7 | 42.1 | 8.4 | 2.8 |

The following observations can be made from the time-temperature results (not shown):

The mixes containing insoluble calcium sulfate anhydrite (i.e., Snow White F&P) consistently yield peak temperatures greater than those for the mixes containing dihydrate form of calcium sulfate (i.e., Land Plaster).

The compositions containing insoluble calcium sulfate anhydrite (i.e., Snow White F&P) are more exothermic. This is evident from the greater area under the time-temperature curves for the mixes containing insoluble calcium sulfate anhydrite.

Even at 12 parts of HAC, the mix with the insoluble calcium sulfate anhydrite (i.e., Snow White F&P) is more exothermic than the mixes utilizing dihydrate form of calcium sulfate (i.e., Land Plaster) at higher levels of HAC (15 and 18 parts of HAC).

Table 4 shows the initial and final set times measured using the Gillmore needles (ASTM C 266) for the various mixes investigated. The following observations can be made:

The mixes containing insoluble calcium sulfate anhydrite (i.e., Snow White F&P) yield final set times that are about 1-½ to 2 minutes shorter than those for the mixes with the dihydrate form of calcium sulfate (i.e., Land Plaster).

The mix with insoluble calcium sulfate anhydrite (i.e., Snow White F&P) even at 12 parts of HAC yields shorter initial and final set times than those for the mix utilizing dihydrate form of calcium sulfate (i.e., Land Plaster) at 18 parts of HAC.

TABLE 4

Influence of calcium sulfate type on setting times at different levels of HAC

| | Dihydrate-Land Plaster | | Anhydrite-Snow White F&P | |
|---|---|---|---|---|
| HAC Parts | Initial Set (minutes) | Final Set (minutes) | Initial Set (minutes) | Final Set (minutes) |
| 12 | 2.33 | 6.07 | 2.00 | 4.12 |
| 15 | 2.17 | 5.25 | 1,75 | 3.25 |
| 18 | 2.17 | 4.90 | 1.33 | 3.00 |

Example 4

In this example, the objective was to investigate the influence of calcium sulfate type on time-temperature response and initial and final set times at different levels of HAC. The design of experiments was similar to that of Example 3 with an exception that an additional HAC level of 9 parts was investigated.

The following two calcium sulfates were investigated:

Dihydrate-Land Plaster, $CaSO_4.2H_2O$

Anhydrite-Snow White F&P, $CaSO_4$

The aforementioned calcium sulfates were evaluated at ⅓ of each of four HAC levels—9, 12, 15 and 18 parts. Thus, in total eight mixes were investigated in this example.

Figure 3:
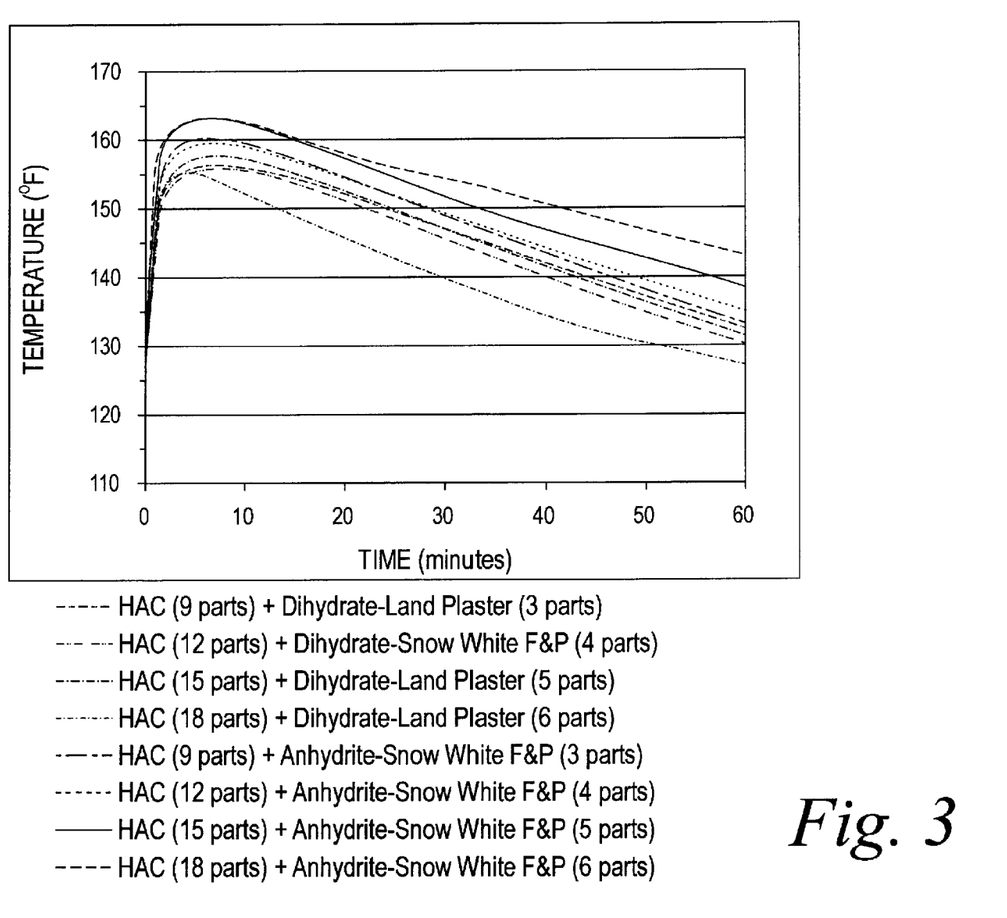
FIG. 3 is a graph of the time versus temperature results of Example 4.

FIG. 3 shows the time versus temperature curve for the eight mixes investigated. The following observations can be made:

The mixes containing insoluble calcium sulfate anhydrite (i.e., the mixes with Snow White F&P) consistently yield peak temperatures greater than those for the mixes containing dihydrate form of calcium sulfate (i.e., the mixes with Land Plaster).

The mixture compositions containing insoluble calcium sulfate anhydrite (i.e., the mixes with Snow White F&P) are more exothermic. This is evident from the greater area under the time- temperature curves for the mixes containing insoluble calcium sulfate anhydrite. Table 4 shows the initial and final set times measured using the Gillmore needles (ASTM C 266) for the various mixes investigated. The following observations can be made:

The mixes containing insoluble calcium sulfate anhydrite (i.e., the mixes with Snow White F&P) yield final set times that are about 1-½ to 2 minutes shorter than those for the mixes containing the dihydrate form of calcium sulfate (i.e., the mixes with Land Plaster).

Even at 9 parts of HAC, the mix containing the insoluble calcium sulfate anhydrite (i.e., Snow White F&P) yields final set time that is about 1 minute shorter than that achieved utilizing dihydrate form of calcium sulfate (i.e., Land Plaster) at 18 parts of HAC.

TABLE 5

Influence of calcium sulfate type on setting times at different levels of HAC

| | Dihydrate-Land Plaster | | Anhydrite-Snow White F&P | |
|---|---|---|---|---|
| HAC Parts | Initial Set (minutes) | Final Set (minutes) | Initial Set (minutes) | Final Set (minutes) |
| 9 | 2.58 | 6.50 | 2.33 | 4.83 |
| 12 | 2.83 | 6.75 | 2.25 | 4.75 |
| 15 | 2.83 | 6.17 | 2.13 | 4.33 |
| 18 | 2.50 | 5.92 | 2.17 | 4.33 |

Example 5

In this example, the objective was to investigate the influence of calcium sulfate dosage on time-temperature response and initial and final set times. The following two calcium sulfates were evaluated:

Dihydrate-Land Plaster, $CaSO_4.2H_2O$

Anhydrite-Snow White F&P, $CaSO_4$

The above calcium sulfates were evaluated at two HAC levels—12 and 15 parts. At 12 parts HAC level, the following dosages of calcium sulfate were tested—33.33%, 50.00% and 100.00% of HAC content. And, at 15 parts HAC level, the following dosages of calcium sulfate were tested—33.33%, 66.67% and 100.00% of HAC content. Thus, in total twelve mixes were investigated in this example.

Figure 4:
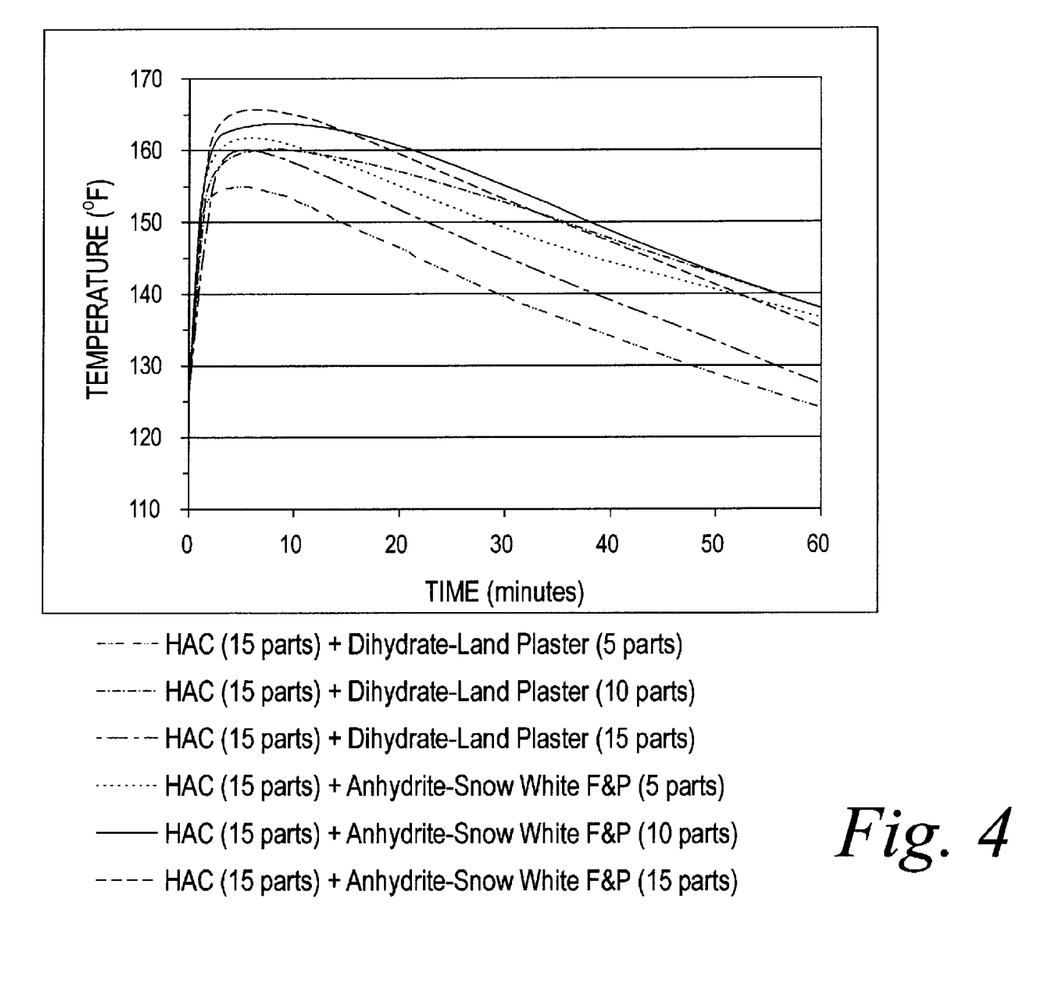
FIG. 4 is graph of the time versus temperature results of Example 5.

FIG. 4 shows the time versus temperature curve for the six mixes investigated at a HAC dosage of 15 parts. The following observations can be made from the time versus temperature results:

In general, the peak temperature attained increases with increase in calcium sulfate dosage. Also, the area under the time-temperature curve increases with increase in calcium sulfate dosage. This behavior depicts that the reaction between the material constituents becomes relatively more exothermic with an increase in calcium sulfate dosage.

Table 6 shows the initial and final set times measured using the Gillmore (ASTM C 266) needles for the various mixes investigated at a HAC dosage of 12 parts. Similarly, Table 7 shows the initial and final set times for the mixes investigated at a HAC dosage of 15 parts. The following observation can be made:

The initial and final set times increase with increase in calcium sulfate content in the range of calcium sulfate dosage tested.

This is despite the fact that the mixes with greater amount of calcium sulfate are more exothermic and yield higher maximum temperature.

TABLE 6

Influence of calcium sulfate type on setting times (HAC - 12 parts)

| Calcium | Dihydrate-Land Plaster | | Anhydrite-Snow White F&P | |
|---|---|---|---|---|
| Sulfate Parts | Initial Set (minutes) | Final Set (minutes) | Initial Set (minutes) | Final Set (minutes) |
| 4 | 2.33 | 6.07 | 2.00 | 4.12 |
| 6 | 2.42 | 7.47 | 2.17 | 5.42 |
| 12 | 3.17 | 9.50 | 2.42 | 10.50 |

TABLE 7

Influence of calcium sulfate type on setting times (HAC - 15 parts)

| Calcium | Dihydrate-Land Plaster | | Anhydrite-Snow White F&P | |
|---|---|---|---|---|
| Sulfate Parts | Initial Set (minutes) | Final Set (minutes) | Initial Set (minutes) | Final Set (minutes) |
| 5 | 2.17 | 5.25 | 1.75 | 3.25 |
| 10 | 2.67 | 5.60 | 1.83 | 4.55 |
| 15 | 2.92 | 7.12 | 2.08 | 8.45 |

Example 6

In this example, the influence of calcium sulfate dosage on time-temperature response and initial and final set times was investigated. The following two calcium sulfates were evaluated:

Dihydrate-Land Plaster, $CaSO_4.2H_2O$

Anhydrite-Snow White F&P, $CaSO_4$

The dosages of calcium sulfate tested were as follows:

33.33% of HAC content (15 parts HAC)

20.00% of HAC content (15 parts HAC)

6.67% of HAC content (15 parts HAC)

Figure 5:
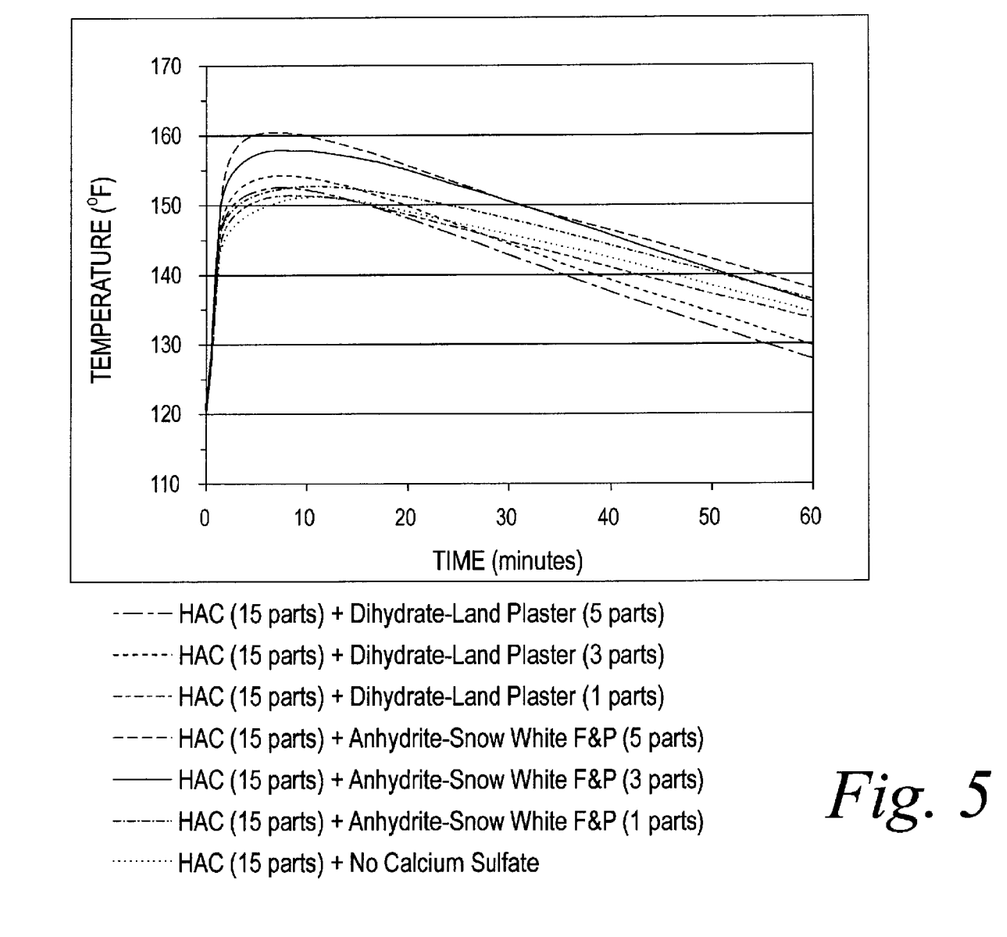
FIG. 5 is graph of the time versus temperature results of Example 6.

One mix was investigated with no calcium sulfate. Thus, in total seven mixes were investigated in this example. The mixture of dry solids (cements and aggregates) was conditioned at 135° F. (50° C.) for 24 hours and the mixture of liquids was equilibrated at 122° F. (50° C.) before conducting the experiments. FIG. 5 shows the time versus temperature curve for the various mixes investigated. The following observations can be made:

In general it can be stated that the peak temperature decreases with decrease in calcium sulfate dosage. This effect is more pronounced for the mixes containing insoluble calcium sulfate anhydrite (i.e., Snow White F&P).

The time-temperature responses for the mixes containing 3 and 5 parts anhydrite display relatively more exothermic behavior in comparison to those for the mixes containing equivalent dosages of the dihydrate form of calcium sulfate (i.e., Land Plaster).

For the mixes containing 1 part anhydrite or dihydrate, the time-temperature response is similar to the mix without any calcium sulfate.

Table 8 shows the initial and final set times measured using the Gillmore needles (ASTM C 266) for the various mixes investigated. The following observation can be made:

The mixes containing 3 and 5 parts anhydrite (i.e., Snow White F&P) have shorter initial and final set times in comparison to those for the mixes containing equivalent amount of dihydrate (i.e., Land Plaster).

The mixes containing 1 part of anhydrite or dihydrate have very long final set times. In general, it can be stated that the setting behavior of the mixes containing 1 part of anhydrite or dihydrate is similar to that of the mixes without any calcium sulfate.

TABLE 8

Influence of calcium sulfate parts on setting times (HAC - 15 parts)

| Calcium | Dihydrate-Land Plaster | | Anhydrite-Snow White F&P | |
|---|---|---|---|---|
| Sulfate Parts | Initial Set (minutes) | Final Set (minutes) | Initial Set (minutes) | Final Set (minutes) |
| 0 | 4.83 | 52.00 | 4.83 | 52.00 |
| 1 | 3.17 | 45.00 | 3.50 | 48.00 |
| 3 | 2.33 | 6.17 | 2.25 | 4.83 |
| 5 | 2.67 | 7.83 | 2.17 | 4.75 |

Example 7

In this example, the objective was to investigate the influence of calcium sulfate type on time-temperature response and initial and final set times for mixtures containing low dosages of HAC (3, 6, 9 and 12 parts).

The following two calcium sulfates were investigated:

Dihydrate-Land Plaster, $CaSO_4.2H_2O$

Anhydrite-Snow White F&P, $CaSO_4$

The HAC and corresponding calcium sulfate dosages tested were as follows:

3 parts HAC and 1 part calcium sulfate 6 parts HAC and 2 parts calcium sulfate 9 parts HAC and 3 parts calcium sulfate 12 parts HAC and 4 parts calcium sulfate Thus, in total eight mixes were investigated.

Figure 6:
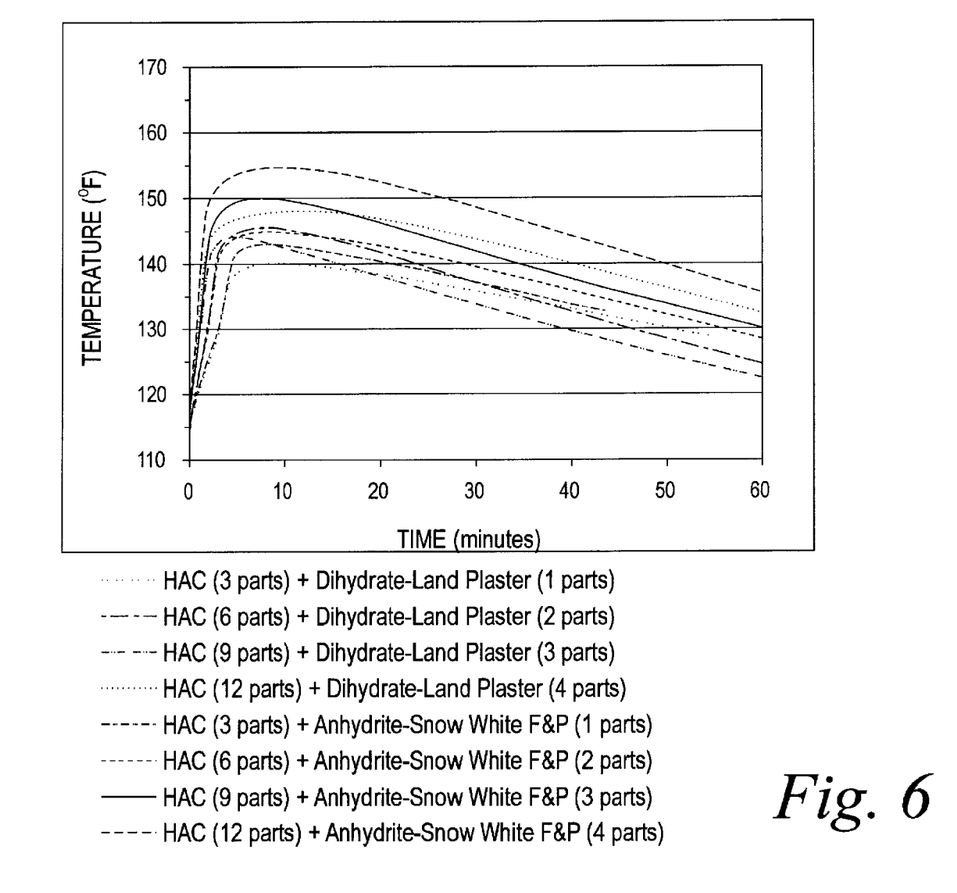
FIG. 6 is a graph of time versus temperature results of Example 7.

The mixture of dry solids (cements and aggregates) was conditioned at room temperature 75° F. (23.9° C.) and the mixture of liquids was equilibrated at 158° F. (70° C.) before conducting the experiments. FIG. 6 shows the time versus temperature response for the various mixes investigated in this example. The following observations can be made from these figures:

The rate of temperature rise depends significantly upon HAC content. The mixes containing 3 parts of HAC have slowest rate of temperature rise followed by the mixes containing 6 parts of HAC.

Land Plaster and Snow White F&P yield nearly identical temperature rise rates. This is particularly true at lower dosages of HAC (3 and 6 parts).

The peak temperature attained increases with increase in HAC content.

The mixes containing insoluble calcium sulfate anhydrite (i.e., the mixes with Snow White F&P) yield peak temperatures greater than those for the corresponding mixes containing dihydrate form of calcium sulfate (i.e., mixes with Land Plaster). The effect is magnified at higher dosages of HAC (i.e. at 9 and 12 parts).

The initial and final set times for the mixes belonging to this series in this example are not reported. This is because the set time measurements were discontinued after it was found that the mixes with 3 and 6 parts of HAC had very long final set times (>30 minutes).

Example 8

In this example, the objective was to investigate the influence of calcium sulfate type on time-temperature response and initial and final set times at an initial slurry temperature lower that that utilized in Example 3. A lower slurry temperature was achieved by equilibrating the liquids at 122° F. (50° C.) instead of 140° F. (60° C.).

The following two calcium sulfates were investigated:

Dihydrate-Land Plaster, $CaSO_4.2H_2O$

Anhydrite-Snow White F&P, $CaSO_4$

The aforementioned calcium sulfates were evaluated at ⅓ of each of three HAC levels—12, 15 and 18 parts. Thus, in total six mixes were investigated.

Figure 2:
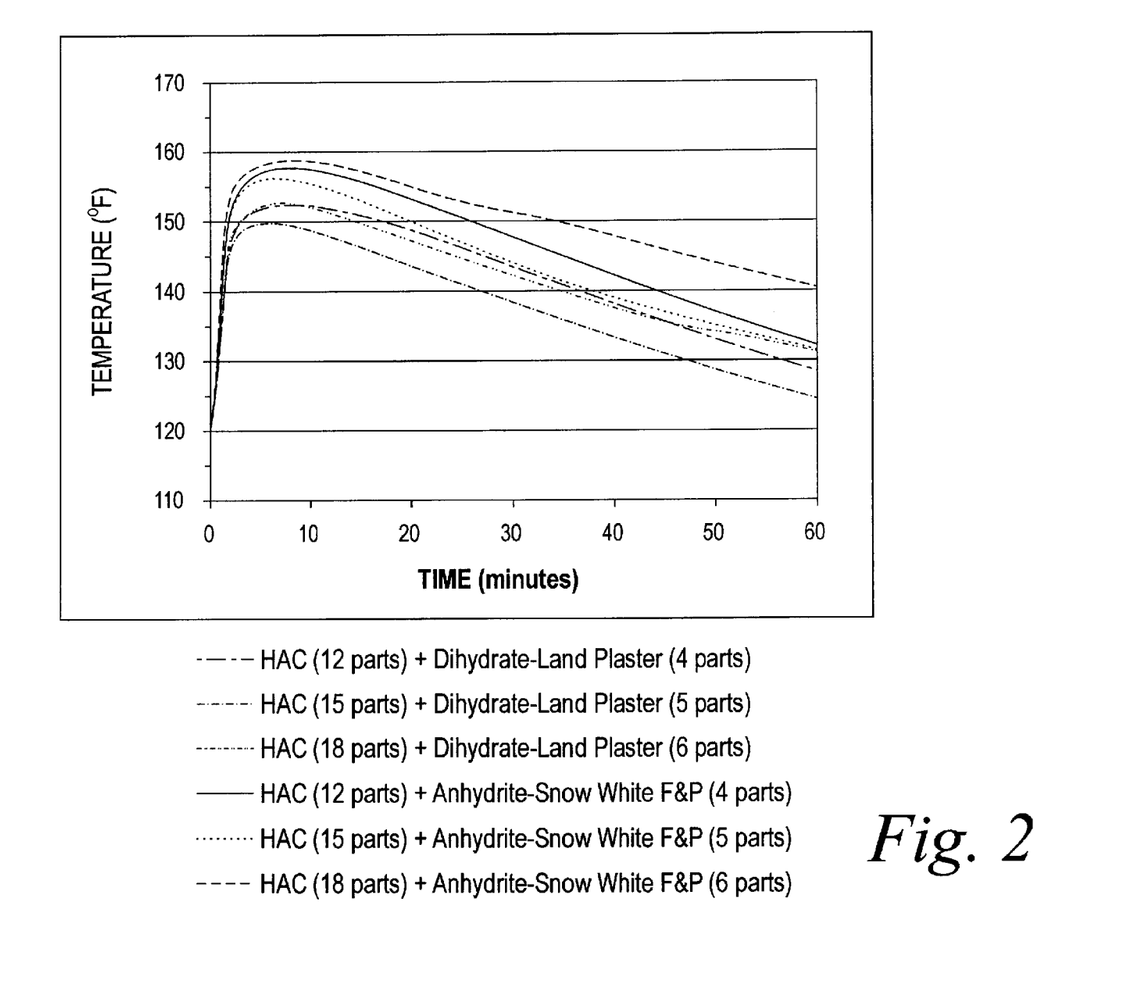
FIG. 2 is a graph of the time versus temperature results of Example 8.

FIG. 2 shows the time versus temperature curve for the six mixes investigated in this example. The following observations can be made:

- The mixes containing insoluble calcium sulfate anhydrite (i.e., the mixes with Snow White F&P) consistently yield peak temperatures greater than those for the mixes containing dihydrate form of calcium sulfate (i.e., the mixes with Land Plaster).
- The mixture compositions containing insoluble calcium sulfate anhydrite (i.e., the mixes with Snow White F&P) are more exothermic. This is evident from the greater area under the time-temperature curves (see FIG. 12) for the mixes containing insoluble calcium sulfate anhydrite. Even at 12 parts of HAC, the mix containing the insoluble calcium sulfate anhydrite is more exothermic than the mixes utilizing dihydrate form of calcium sulfate at higher HAC levels (15 and 18 HAC parts).

Table 9 shows the initial and final set times measured using the Gillmore needles (ASTM C 266) for the various mixes investigated. The following observations can be made:

- The mixes containing insoluble calcium sulfate anhydrite (i.e., the mixes with Snow White F&P) yield final set times that are about 2 minutes shorter than those for the mixes containing the dihydrate form of calcium sulfate (i.e., the mixes with Land Plaster).
- Even at 12 parts of HAC, the mix containing the insoluble calcium sulfate anhydrite (i.e., Snow White F&P) yields final set time that is about 1-½ minute shorter than that achieved utilizing dihydrate form of calcium sulfate (i.e., Land Plaster) at 18 parts of HAC.

TABLE 9

Influence of calcium sulfate type on setting times at different levels of HAC

| | Dihydrate-Land Plaster | | Anhydrite-Snow White F&P | |
|---|---|---|---|---|
| HAC Parts | Initial Set (minutes) | Final Set (minutes) | Initial Set (minutes) | Final Set (minutes) |
| 12 | 3.33 | 8.58 | 2.97 | 6.33 |
| 15 | 2.83 | 7.83 | 2.58 | 6.08 |
| 18 | 2.92 | 7.75 | 2.33 | 4.50 |

Example 9

Mechanical Performance

Influence of the following calcium sulfates on mechanical properties of lightweight concrete mixtures was investigated:

Dihydrate-Land Plaster, $CaSO_4.2H_2O$

Anhydrite-Snow White F&P, $CaSO_4$

Evaluation of mechanical properties of air-entrained, lightweight concrete mixtures was done at three different HAC dosages—12, 15 and 18 parts (Portland cement Type III—100 parts, Fly Ash—90 parts and Calcium sulfate—⅓$^{rd}$ of HAC parts). In total six mixtures were investigated. The density of the cement boards cast was around 78 pcf. Lightweight expanded shale aggregates were used as part of the composition to reduce the density of the board. The weight ratio of the lightweight aggregate to the reactive powder blend was 0.90/1. The density of the cement boards was further reduced by means of air entrainment.

Cement boards half-inch thickness (12.7 mm) were cast for the mixtures containing different levels of HAC as described above. Both top and bottom surfaces of the boards were reinforced with a polymer coated glass-fiber reinforced mesh. The mechanial properties of the cement boards as derived from the experimental test response are reported below:

Flexural Properties:

Third-point bending tests were conducted according to the ASTM C 947 test method. The specimens were tested at 10" span (254 mm). The testing was performed on a close-loop MTS testing system. The load was applied at a constant displacement rate of 0.1"/1 minute (2.54 mm/1 minute). The following flexural properties were calculated according to the ASTM C 947 and ASTM C 1325 test methods for the various mixes investigated:

Proportional Elastic Limit (PEL)

Apparent Modulus of Elasticity (AMOE)

Modulus of Rupture (MOR)

Table 10 shows the test results for the six mixture compositions investigated. It can be observed that the flexural properties of the mixes containing anhydrite (i.e., Snow White F&P) are comparable to those for the mixtures containing dihydrate form of calcium sulfate (i.e., Land Plaster).

Nail Pull Strength:

The cement boards were tested for their nail pull strength according to the ASTM C 1325 test method. Table 11 shows the nail pull strength for the six mixes investigated. It can be seen that the nail pull strengths of the mixes containing anhydrite (i.e., Snow White F&P) are comparable to those for the mixtures containing dihydrate form of calcium sulfate (i.e., Land Plaster).

TABLE 10

Influence of calcium sulfate type on flexural properties

| | Dihydrate-Land Plaster | | | Anhydrite-Snow White F&P | | |
|---|---|---|---|---|---|---|
| HAC Parts | PEL psi (kPa) | AMOE psi (kPa) | MOR psi (kPa) | PEL psi (kPa) | AMOE psi (kPa) | MOR psi (kPa) |
| 9 | 319 (2199) | 293 (2020) | 1000 | 287 (1979) | 319 (2199) | 983 (6777) |
| 12 | 247 (1702) | 237 (1634) | 913 | 306 (2110) | 385 (2654) | 936 (6453) |
| 15 | 221 (1524) | 263 (1813) | 898 | 252 (1737) | 280 (1931) | 923 (6363) |

TABLE 11

Influence of calcium sulfate type on nail pull strength

| | Dihydrate-Land Plaster | | Anhydrite-Snow White F&P | |
| --- | --- | --- | --- | --- |
| HAC Parts | Thickness Inches (mm) | Nail Pull Pounds (N) | Thickness Inches (mm) | Nail Pull Pounds (N) |
| 9 | 0.512 (13) | 213 (947) | 0.484 (12.3) | 215 (956) |
| 12 | 0.489 (12.4) | 193 (858) | 0.496 (12.6) | 223 (992) |
| 15 | 0.510 (12.9) | 223 (991) | 0.492 (12.5) | 202 (898) |

The major conclusions that can be drawn from the examples presented above are as follows:

Employing anhydrous calcium sulfate instead of calcium sulfate dihydrate (e.g., land plaster) yields a composition that is relatively more exothermic with shortened initial and final set times. The extent of reduction in the final setting time ranges between 1 to 3 minutes depending upon the HAC usage and the initial slurry temperature.

The mixture compositions containing anhydrous calcium sulfate are relatively more exothermic, yield higher peak slurry temperature, and have shortest setting times in comparison to those containing other varieties of calcium sulfates.

Mechanical properties of cement boards manufactured utilizing the compositions containing anhydrous calcium sulfate are comparable to those for the boards manufactured using the compositions containing sulfate dihydrate.

In summary, the distinctive features and tangible benefits of the present invention are as follows:

Use of insoluble calcium sulfate anhydrite in the composition of the invention leads to very short final setting times. Final setting times as low as 3 to 6 minutes are obtainable with the use of the composition containing insoluble calcium sulfate anhydrite.

Very short setting times are obtainable even at very low usage levels of high alumina cement in the cementitious composition of the invention. Reduction in high alumina cement usage helps to significantly lower the cost of the product since high alumina cement is the most expensive component of the reactive powder blend.

Very short setting times are obtainable even at very high usage levels of pozzolanic materials in the cementitious composition of the invention. High usage of pozzolanic material such as fly ash helps to lower the cost of the product. High usage of pozzolanic material is also helpful in improving the long-term durability of the product, since pozzolanic materials decrease the alkalinity of the cementitious matrix and thereby reduce the potential for degradation of the polymer coated glass fiber mesh.

Very short setting times are obtainable without the use of externally added lime in the cementitious composition on the invention. Eliminating externally added lime in the composition helps to reduce the alkalinity of the cementitious matrix and thereby increase the long-term durability of the polymer coated glass fiber mesh and the resulting cement boards.

Final setting times as low as 3 to 6 minutes help to significantly increase the production output and lower the production cost of the cement boards.

What is claimed is:

1. A rapid setting cementitious composition comprising as a reactive powder blend:
    (a) 35 to 90 wt % portland cement;
    (b) 0 to 55 wt % pozzolan
    (c) 5 to 15 wt % high alumina cement; and
    (d) 1 to 8 wt % insoluble calcium sulfate anhydrite.

2. A cementitious composition of claim 1 wherein said pozzolan is at least one member of the group consisting of pumice, perlite, diatomaceous earth, silica fume, tuff, trass, rice husk, metakaolin, ground granulated blast furnace slag, and fly ash.

3. A cementitious composition of claim 2 wherein the pozzolan is fly ash.

4. A cementitious composition of claim 3 wherein said fly ash is present in 75–125 parts by weight to 100 parts by weight of portland cement.

5. A cementitious composition of claim 1 further comprising one or more lightweight aggregates and fillers.

6. A cementitious composition of claim 5 wherein said aggregates and fillers are selected from the group consisting of blast furnace slag, volcanic tuff, pumice, expanded forms of clay, shale, perlite and vermiculite, hollow ceramic spheres, hollow plastic spheres, and expanded plastic beads.

7. A cementitious composition of claim 5 wherein said lightweight aggregates and fillers comprise expanded shale, clay, and mixtures thereof.

8. A cementitious composition of claim 5 wherein said lightweight aggregates and fillers are present as 1 to 200 parts by weight for each 100 parts by weight of said reactive powder blend.

9. A cementitious composition of claim 1 wherein said portland cement is ASTM Type III portland cement.

10. A cementitious composition of claim 1 further comprising lime.

11. A cementitious composition of claim 6 further comprising additives to control mixture fluidity and to prevent flash setting of the mixture.

12. A cementitious composition of claim 11 wherein said additives comprise a superplasticizer, a set retarder, and a set accelerator.

13. A cementitious composition of claim 12 wherein said superplasticizer is selected from the group consisting of polynapthalene sulfonate, polyacrylates, lignosulfonates, melamine sulfonates, or mixtures thereof; said set retarder is selected from the group consisting of sodium citrate, citric acid, potassium tartrate, sodium tartrate, or mixtures thereof; and said set accelerator is selected from the group consisting of sodium carbonate, calcium chloride, calcium nitrate, calcium nitrite, calcium formate, calcium acetate, or mixtures thereof.

14. A cementitious composition of claim 12 wherein said additives comprise a polynapthalene sulfonate, sodium citrate, and sodium carbonate.

15. A cementitious composition of claim 12 wherein said additives each are present in an amount less than 1.0 wt % relative to the reactive powder blend.

16. A cementitious composition of claim 1 wherein the weight ratio of high alumina cement to insoluble calcium sulfate anhydrite is 5/1 to 2/1.

17. A cementitious composition of claim 16 wherein the weight ratio of high alumina cement to insoluble calcium sulfate anhydrite is about 3/1.

18. A cementitious composition of claim 5 further comprising water in an amount sufficient to form a settable slurry.

19. A cementitious composition of claim 18 wherein the weight ratio of said water to the reactive powder blend is about 0.30/1 to 0.60/1.

20. A cementitious composition of claim 19 wherein the eight ratio of said water to the reactive powder blend is about 0.40/1.

21. A cementitious composition of claim 18 wherein said settable slurry has a temperature of about 75 to 150° F. at the time of mixing.

22. A cementitious composition of claim 21 wherein said settable slurry has a temperature of 120° F. at the time of mixing.

23. A cement board comprising a rapidly set mixture of a suitable amount of water with a cementitious composition comprising as a reactive powder blend:
(a) 35 to 90 wt % portland cement;
(b) 0 to 55 wt % pozzolan;
(c) 5 to 15 wt % high alumina cement; and
(d) 1 to 8 wt % insoluble calcium sulfate anhydrite.

24. A cement board of claim 23 wherein in the reactive powder blend of said cementitious composition the portland cement is 80 to 90 wt %, the high alumina cement is 5 to 15 wt %, and the insoluble calcium sulfate anhydrite is 1 to 8 wt %.

25. A cement board of claim 24 wherein the said pozzolan is at least one member of the group consisting of pumice, perlite, diatomaceous earth, silica fume, tuff, trass, rice husk, metakaolin, ground granulated blast furnace slag, and fly ash.

26. A cement board of claim 25 wherein said pozzolan is fly ash.

27. A cement board of claim 25 wherein said fly ash is present in 75 to 125 parts by weight to 100 parts by weight of portland cement.

28. A cement board of claim 23 further comprising lightweight aggregates and fillers.

29. A cement board of claim 28 wherein said lightweight aggregates and fillers are selected from the group consisting of blast furnace slag, volcanic tuff, pumice, expanded forms of clay, shale, perlite and vermiculite, hollow ceramic spheres, hollow plastic spheres, and expanded plastic beads.

30. A cement board of claim 29 wherein said lightweight aggregates and fillers comprise expanded shale, clay, and mixtures thereof.

31. A cement board of claim 28 wherein said lightweight aggregates and fillers are present as 1 to 200 parts by weight for each 100 parts by weight of said cementitious composition.

32. A cement board of claim 23 wherein said cementitious composition further comprises lime.

33. A cement board of claim 23 wherein said portland cement is ASTM Type III portland cement.

34. A cement board of claim 23 further comprising additives to control mixture fluidity and to prevent flash setting.

35. A cement board of claim 34 wherein said additives comprise a superplasticizer, a set retarder, and a set accelerator.

36. A cement board of claim 35 wherein said superplasticizer is selected from the group consisting of polynapthalene sulfonate, polyacrylates, lignosulfonates, melamine sulfonates, or mixtures thereof; said set retarder is selected from the group consisting of sodium citrate, citric acid, potassium tartrate, sodium tartrate, or mixtures thereof; and said set accelerator is selected from the group consisting of sodium carbonate, calcium chloride, calcium nitrate, calcium nitrite, calcium formate, calcium acetate, or mixtures thereof.

37. A cement board of claim 36 wherein said additives comprise a polynapthalene sulfonate sodium citrate, and sodium carbonate.

38. A cement board of claim 34 wherein said additives each are present in an amount less than 1.0 wt % relative to the reactive powder blend.

39. A cement board of claim 23 wherein the weight ratio of the high alumina cement to insoluble calcium sulfate anhydrite is 5/1 to 2/1.

40. A cement board of claim 39 wherein the weight ratio of high alumina cement to insoluble calcium sulfate anhydrite is about 3/1.

41. A cement board of claim 23 wherein said water is present in amount sufficient to form a settable slurry.

42. A cement board of claim 41 wherein the weight ratio of said water to said reactive powder blend is about 0.30/1 to 0.60/1.

43. A cement board of claim 42 wherein the weight ratio of said water to the reactive powder blend is about 0.40/1.

44. A cement board of claim 41 wherein said settable slurry has a temperature of about 75 to 150° F. at the time of mixing.

45. A cement board of claim 44 wherein said settable slurry has a temperature of about 120° F. at the time of mixing.

\* \* \* \* \*